(12) United States Patent
Li et al.

(10) Patent No.: US 12,716,818 B2
(45) Date of Patent: Aug. 25, 2026

(54) PLATFORM FOR TESTING EXCAVATION RESISTANCE OF SMALL-SIZED BACKHOE EXCAVATOR

(71) Applicant: Guangxi University of Science and Technology, Liuzhou (CN)

(72) Inventors: Bing Li, Liuzhou (CN); Wubin Xu, Liuzhou (CN); Dengsheng Cai, Liuzhou (CN); Jinquan Sun, Liuzhou (CN); Xin He, Liuzhou (CN)

(73) Assignee: Guangxi University of Science and Technology, Liuzhou (CN)

( * ) Notice: Subject to any disclaimer, the term of this patent is extended or adjusted under 35 U.S.C. 154(b) by 281 days.

(21) Appl. No.: 18/395,773

(22) Filed: Dec. 26, 2023

(65) Prior Publication Data

US 2024/0210282 A1 Jun. 27, 2024

(30) Foreign Application Priority Data

Dec. 26, 2022 (CN) ........................ 202211673359.6

(51) Int. Cl.
*G01M 99/00* (2011.01)
*E02F 3/32* (2006.01)
*E02F 9/26* (2006.01)

(52) U.S. Cl.
CPC .......... *G01M 99/007* (2013.01); *E02F 9/267* (2013.01); *E02F 3/325* (2013.01)

(58) Field of Classification Search
CPC . E02F 9/267; E02F 3/43; E02F 9/2264; E02F 3/36; E02F 3/28; E02F 3/30; E02F 3/422; E02F 9/2004; E02F 9/2029; E02F 5/022; E02F 3/38; E02F 3/32; E02F 9/26; E02F 3/283; E02F 9/00; E02F 9/20; E02F 3/52; E02F 9/18; E02F 9/2037; E02F 9/2207; E02F 3/40; E02F 3/425; E02F 9/08; E02F 9/264; E02F 9/22; G01L 5/0061; G01L 5/00; G01L 5/1627; G01L 1/00; G01L 5/0066; G01L 5/161; G01D 21/02; G06F 30/20; G06F 30/17; G06F 30/23; G06F 30/15; G01M 99/007; G01M 99/005; G01M 13/00; B60P 3/00; G01G 3/13; G01G 15/04; G01G 19/14; G01G 19/12; G01G 19/086; G01G 19/52; G01S 19/46; F15B 19/00; G01N 3/38; G09B 25/02
See application file for complete search history.

(56) References Cited

FOREIGN PATENT DOCUMENTS

CN 106197801 A * 12/2016 .......... G01L 5/0061

* cited by examiner

*Primary Examiner* — Brandi N Hopkins
(74) *Attorney, Agent, or Firm* — Bayramoglu Law Offices LLC

(57) ABSTRACT

A platform for testing the excavation resistance of a small-sized backhoe excavator is provided. The testing platform comprises a bucket, a mechanical arm device, a measuring device, a workbench frame, and a control device. The bucket is hinged to the mechanical arm device, which is fixed on the workbench frame; the control device is electrically connected to the measuring device, data acquired by the measuring device is used to construct a force balance equation, and through force analysis, excavation resistance is obtained.

5 Claims, 11 Drawing Sheets

PLATFORM FOR TESTING EXCAVATION RESISTANCE OF SMALL-SIZED BACKHOE EXCAVATOR

CROSS-REFERENCE TO THE RELATED APPLICATIONS

This application is based upon and claims priority to Chinese Patent Application No. 202211673359.6, filed on Dec. 26, 2022, the entire contents of which are incorporated herein by reference.

TECHNICAL FIELD

The present invention relates to the technical field of engineering machinery, and in particular to a platform for testing the excavation resistance of a small-sized backhoe excavator.

BACKGROUND

Presently, excavators represent the most prevalent and versatile category of earth-rock engineering machinery in the market. The bucket and bucket teeth are the core components of excavators, directly interacting with the working medium and enduring substantial impact loads. In extreme working conditions such as clay, frozen ground, or gravel, issues like bucket cracking and tooth breakage often arise, significantly impacting the working efficiency of excavators. Currently, excavators lack a direct resistance testing device, resulting in operators being unable to accurately assess the magnitude of excavation resistance. This frequently leads to overloaded operations during working conditions such as excavation and fragmentation of large rocks, causing severe bucket wear.

Due to the complex working conditions of excavators and the continuously changing force on the bucket, directly measuring excavation resistance by installing sensors on the bucket is impossible, and the acquisition of the excavation resistance becomes a technical challenge.

Existing methods for testing excavation resistance often involve installing pressure sensors and displacement sensors on the oil cylinder part and installing pin shaft sensors at various hinge point parts to measure sensor values during excavation operations. The excavation resistance value of the bucket is calculated through theoretical derivation. However, current testing technologies have two main drawbacks: Firstly, the sensor installation and data acquisition systems are complex, and pin shaft sensors need to be customized, resulting in lengthy cycles and high costs. Secondly, the testing precision is low, and the calculation formulas for bucket resistance are complex, making the derived calculation results unable to accurately and intuitively reflect the resistance encountered during bucket excavation operations.

Therefore, the urgent challenge faced by those skilled in the art is to provide a platform for testing the excavation resistance of a small-sized backhoe excavator which is simple to operate and with straightforward calculations.

SUMMARY

In view of the above, the present invention provides a platform for testing the excavation resistance of a small-sized backhoe excavator to address the complexities in calculations and difficulties in sensor arrangement in the prior art.

To achieve the above objectives, the present invention adopts the following technical solutions:

Provided is a platform for testing excavation resistance of a small-sized backhoe excavator, comprising a bucket, a mechanical arm device, a measuring device, a workbench frame, and a control device, wherein the bucket is hinged to the mechanical arm device, which is fixed on the workbench frame; the control device is electrically connected to the measuring device, data acquired by the measuring device is used to construct a force balance equation, and through force analysis, excavation resistance is obtained.

Preferably, in the above platform for testing excavation resistance of a small-sized backhoe excavator, the mechanical arm device comprises a forearm, an electric push rod for the bucket, an upper arm, an electric push rod for the forearm, an electric push rod for the upper arm, a bucket connecting rod, and a forearm connecting rod, wherein the upper arm is hinged to the forearm; a fixed end of the electric push rod for the bucket is fixed on the forearm, with a free end hinged to the bucket through the bucket connecting rod to drive bucket movement; one end of the forearm connecting rod is hinged to the forearm, with the other end connected to a hinge point between the bucket connecting rod and the electric push rod for the bucket; a fixed end of the electric push rod for the forearm is fixed on the upper arm, with a free end connected to the forearm to drive forearm movement; and a fixed end of the electric push rod for the upper arm is fixed on the workbench frame, with a free end connected to the upper arm to drive upper arm movement.

Preferably, in the above platform for testing excavation resistance of a small-sized backhoe excavator, the measuring device comprises a bucket push rod displacement sensor, a forearm push rod displacement sensor, an upper arm push rod displacement sensor, and four pin shaft sensors, wherein the bucket push rod displacement sensor is installed on the electric push rod for the bucket to obtain displacement thereof; the forearm push rod displacement sensor is installed on the electric push rod for the forearm to obtain displacement thereof; the upper arm push rod displacement sensor is installed on the electric push rod for the upper arm to obtain displacement thereof; and the pin shaft sensors are installed on both sides of a hinge point between the bucket and the forearm and on both sides of a hinge point between the bucket connecting rod and the bucket.

Preferably, in the above platform for testing excavation resistance of a small-sized backhoe excavator, the control device comprises a driving device, a data acquisition card, a master computer, a displacement sensor signal processing module, and a pin shaft sensor signal processing module, wherein the driving device drives the electric push rod for the bucket, the electric push rod for the forearm, and the electric push rod for the upper arm, respectively; the displacement sensor signal processing module is electrically connected to the bucket push rod displacement sensor, the forearm push rod displacement sensor, and the upper arm push rod displacement sensor, respectively; the pin shaft sensor signal processing module is electrically connected to the four pin shaft sensors, respectively; the driving device, the displacement sensor signal processing module, and the pin shaft sensor signal processing module are electrically connected to the data acquisition card, respectively; and the data acquisition card interacts with the master computer for data exchange.

Preferably, in the above platform for testing excavation resistance of a small-sized backhoe excavator, the mechanical arm device comprises a forearm, an electric push rod for the bucket, an upper arm, an electric push rod for the forearm, an electric push rod for the upper arm, a bucket connecting rod, a forearm connecting rod, a sensor bracket, and a boom hinge bracket, wherein the upper arm is hinged to the forearm; a fixed end of the electric push rod for the bucket is fixed on the forearm, with a free end hinged to the bucket through the bucket connecting rod to drive bucket movement; one end of the forearm connecting rod is hinged to the forearm, with the other end connected to a hinge point between the bucket connecting rod and the electric push rod for the bucket; a fixed end of the electric push rod for the forearm is fixed on the upper arm, with a free end connected to the forearm to drive forearm movement; a fixed end of the electric push rod for the upper arm is fixed on the boom hinge bracket, with a free end connected to the upper arm to drive upper arm movement; and the boom hinge bracket is installed on the workbench frame through the sensor bracket.

Preferably, in the above platform for testing excavation resistance of a small-sized backhoe excavator, the measuring device comprises six force sensors, and the sensor bracket consists of mutually perpendicular first installation surface and second installation surface, wherein three of the force sensors are arranged on each of the first installation surface and the second installation surface, and the three force sensors on each installation surface are arranged in a triangular configuration; a first component force of resistance is obtained through the first installation surface, and a second component force of the resistance is obtained through the second installation surface; a lateral offset and a tilting offset are obtained based on a difference between the force sensors on each installation surface.

Preferably, in the above platform for testing excavation resistance of a small-sized backhoe excavator, the control device comprises a driving device, a force sensor transmitter group, a data acquisition card, and a master computer, wherein the driving device drives the electric push rod for the bucket, the electric push rod for the forearm, and the electric push rod for the upper arm, respectively; the force sensor transmitter group is electrically connected to the six force sensors, respectively; the driving device and the force sensor transmitter group are electrically connected to the data acquisition card, respectively; and the data acquisition card interacts with the master computer for data exchange.

As can be seen from the above technical solutions, compared with the prior art, the platform for testing the excavation resistance of a small-sized backhoe excavator disclosed herein has a small volume and allows for simulation of excavation processes and measurement of excavation resistance in indoor laboratory environments. Using the test bench to validate excavation resistance analysis formulas can effectively reduce the workload of experimental personnel, improve research efficiency, and lower research and development costs. Additionally, the testing platform is easy to control and boasts fast response speed, lower manufacturing costs, reduced equipment weight, and ease of manufacturing.

BRIEF DESCRIPTION OF THE DRAWINGS

In order to more clearly illustrate the technical solutions in the embodiments of the present invention or in the prior art, the accompanying drawings required in the description of the embodiments or the prior art are briefly introduced below. It is obvious that the accompanying drawings in the description below are merely embodiments of the present invention, and those of ordinary skills in the art can obtain other drawings according to the accompanying drawings provided without creative efforts.

DETAILED DESCRIPTION OF THE EMBODIMENTS

Figure 1:
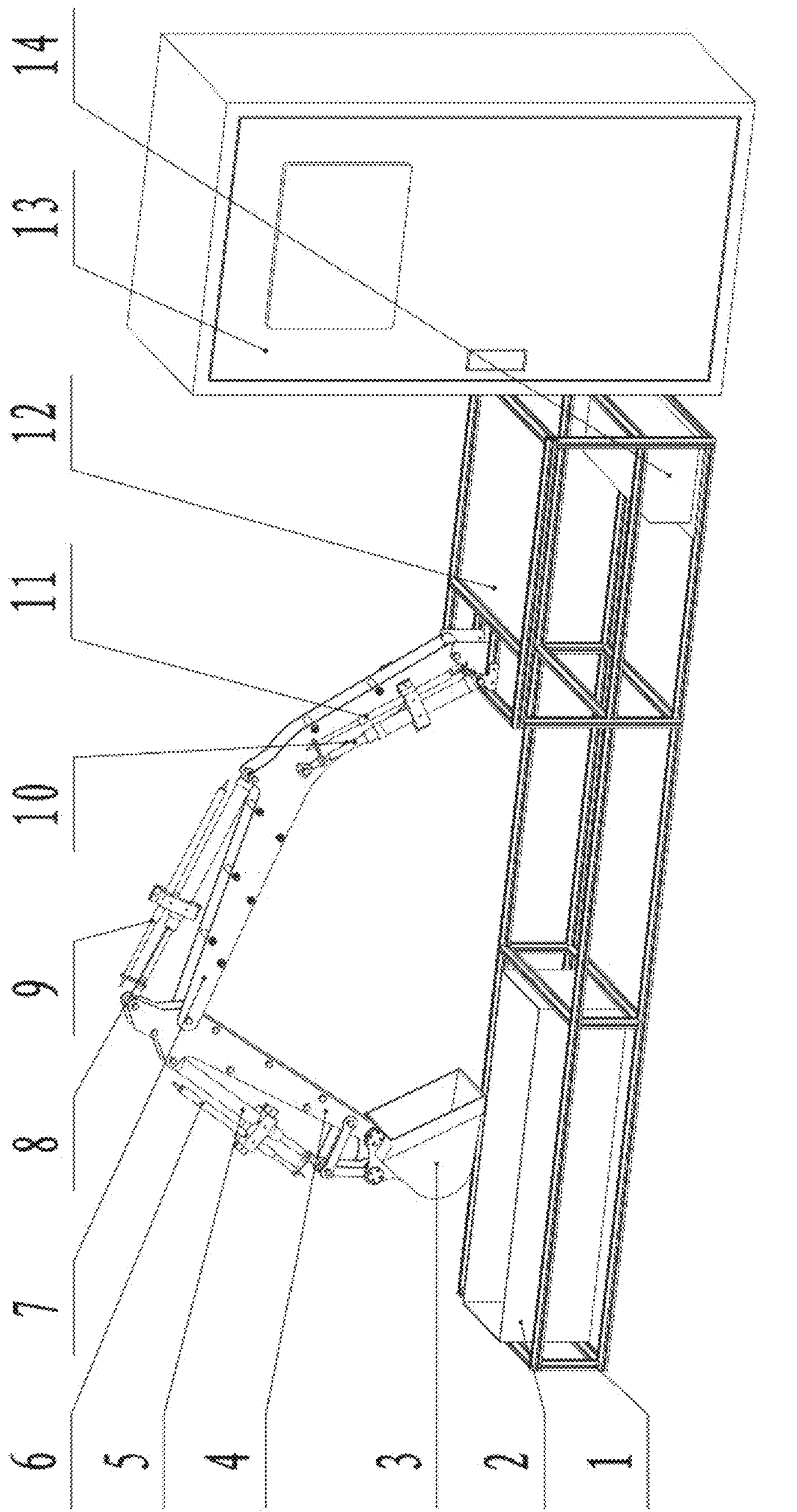
FIG. 1 is an overall side view of Embodiment 1 according to the present invention.

The technical solutions in the embodiments of the present invention will be clearly and completely described below with reference to the accompanying drawings in the embodiments of the present invention, and it is obvious that the described embodiments are only a part of the embodiments of the present invention but not all of them. Based on the embodiments of the present invention, all other embodiments obtained by those of ordinary skills in the art without creative efforts shall fall within the protection scope of the present invention.

Embodiment 1

The present embodiment discloses a platform for testing the excavation resistance of a small-sized backhoe excavator, which comprises a bucket, a mechanical arm device, a measuring device, a workbench frame, and a control device.

The bucket is hinged to the mechanical arm device, which is fixed on the workbench frame; the control device is electrically connected to the measuring device, data acquired by the measuring device is used to construct a force balance equation, and through force analysis, excavation resistance is obtained.

To further optimize the above technical solution, the mechanical arm device comprises a forearm, an electric push rod for the bucket, an upper arm, an electric push rod for the forearm, an electric push rod for the upper arm, a bucket connecting rod, and a forearm connecting rod.

The upper arm is hinged to the forearm. The fixed end of the electric push rod for the bucket is fixed on the forearm, with the free end hinged to the bucket through the bucket connecting rod to drive bucket movement. One end of the forearm connecting rod is hinged to the forearm, with the other end connected to the hinge point between the bucket connecting rod and the electric push rod for the bucket. The fixed end of the electric push rod for the forearm is fixed on the upper arm, with the free end connected to the forearm to drive forearm movement. The fixed end of the electric push rod for the upper arm is fixed on the workbench frame, with the free end connected to the upper arm to drive upper arm movement.

To further optimize the above technical solution, the measuring device comprises a bucket push rod displacement sensor, a forearm push rod displacement sensor, an upper arm push rod displacement sensor, and four pin shaft sensors. The bucket push rod displacement sensor is installed on the electric push rod for the bucket to obtain the displacement thereof. The forearm push rod displacement sensor is installed on the electric push rod for the forearm to obtain the displacement thereof. The upper arm push rod displacement sensor is installed on the electric push rod for the upper arm to obtain the displacement thereof. The pin shaft sensors are installed on both sides of the hinge point between the bucket and the forearm and on both sides of the hinge point between the bucket connecting rod and the bucket.

To further optimize the above technical solution, the control device comprises a driving device, a data acquisition card, a master computer, a displacement sensor signal processing module, and a pin shaft sensor signal processing module. The driving device drives the electric push rod for the bucket, the electric push rod for the forearm, and the electric push rod for the upper arm, respectively. The displacement sensor signal processing module is electrically connected to the bucket push rod displacement sensor, the forearm push rod displacement sensor, and the upper arm push rod displacement sensor, respectively. The pin shaft sensor signal processing module is electrically connected to the four pin shaft sensors, respectively. The driving device, the displacement sensor signal processing module, and the pin shaft sensor signal processing module are electrically connected to the data acquisition card, respectively. The data acquisition card interacts with the master computer for data exchange.

Specifically, the mechanical working section comprises a material box fixing frame 1, a material box 2, a bucket 3, a forearm 4, an electric push rod for the bucket 5, an upper arm 7, an electric push rod for the forearm 8, an electric push rod for the upper arm 10, a workbench frame 12, a balance weight block 14, a bucket connecting rod 16, and a forearm connecting rod 17.

The sensing and detection section comprises a bucket push rod displacement sensor 6, a forearm push rod displacement sensor 9, an upper arm push rod displacement sensor 11, and pin shaft sensors 15.

The control section comprises an electrical cabinet 13, a bucket push rod drive module 13.1, a forearm push rod drive module 13.2, an upper arm push rod drive module 13.3, a data acquisition card 13.4, a computer 13.5, a displacement sensor signal processing module 13.6, and a pin shaft sensor signal processing module 13.7.

Figure 4:
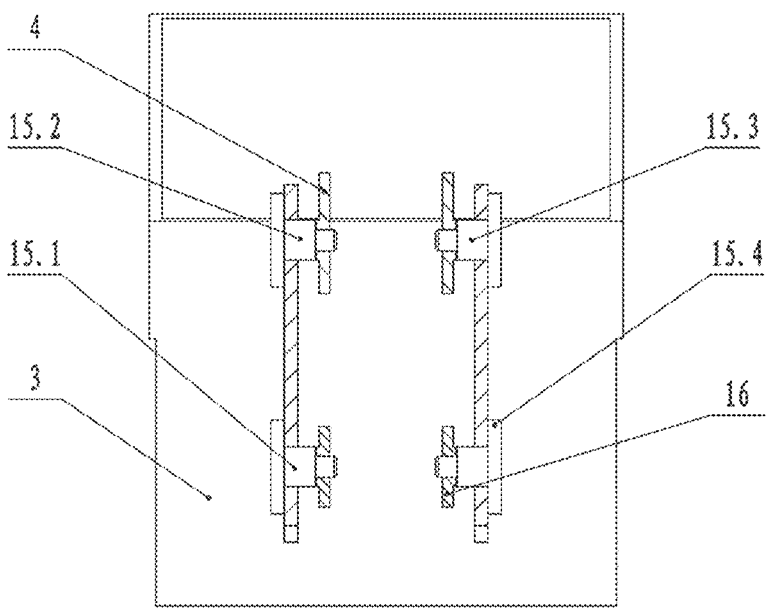
FIG. 4 is a schematic diagram of the installation position of a pin shaft sensor in Embodiment 1 according to the present invention.

The pin shaft sensors 15 comprise a left bucket-forearm pin shaft sensor 15.2 and a right bucket-forearm pin shaft sensor 15.3 installed between the bucket 3 and the forearm 4, and a left bucket-bucket connecting rod pin shaft sensor 15.1 and a right bucket-bucket connecting rod pin shaft sensor 15.4 installed between the bucket 3 and the bucket connecting rod 16. All the pin shaft sensors 15 are fixed on the bucket 3, as shown in FIG. 4.

The electric push rod for the bucket 5, the electric push rod for the forearm 8, the electric push rod for the upper arm 10, the bucket push rod drive module 13.1, the forearm push rod drive module 13.2, the upper arm push rod drive module 13.3, the data acquisition card 13.4, and the computer 13.5 collectively constitute the position and posture control system, controlling the testing platform to complete the designated movements.

The data acquisition card 13.4, the computer 13.5, the displacement sensor signal processing module 13.6, the bucket push rod displacement sensor 6, the forearm push rod displacement sensor 9, and the upper arm push rod displacement sensor 11 collectively constitute the position and posture monitoring system, responsible for monitoring the real-time position and posture information of the testing platform.

The pin shaft sensors 15, the data acquisition card 13.4, the computer 13.5, and the pin shaft sensor signal processing module 13.7 collectively constitute the resistance measurement system, responsible for measuring the excavation resistance on the bucket during the operation.

The material box fixing frame 1 is used to position the material box, ensuring that the material box does not undergo relative displacement to the testing platform to affect the experimental results during the operation of the testing platform.

The balance weight block 14 is used to adjust the center-of-gravity position of the testing platform, ensuring stability during the operation.

Figure 2:
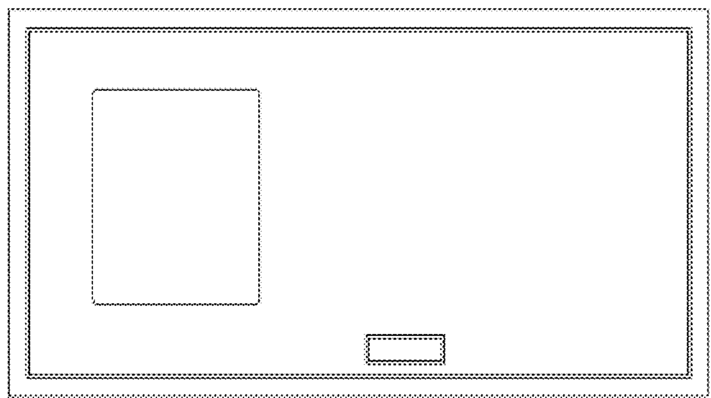
FIG. 2 is an overall front view of Embodiment 1 according to the present invention.
Figure 2:
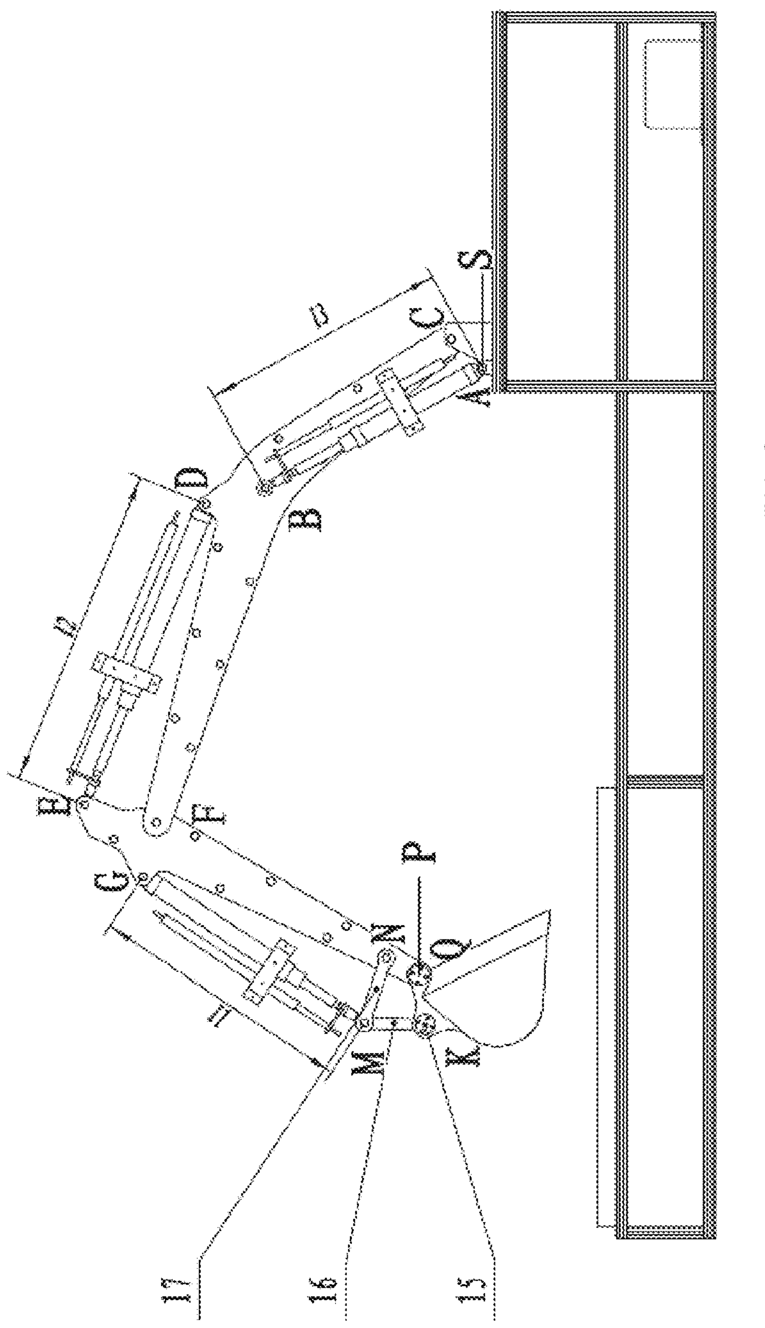
Figure 3:
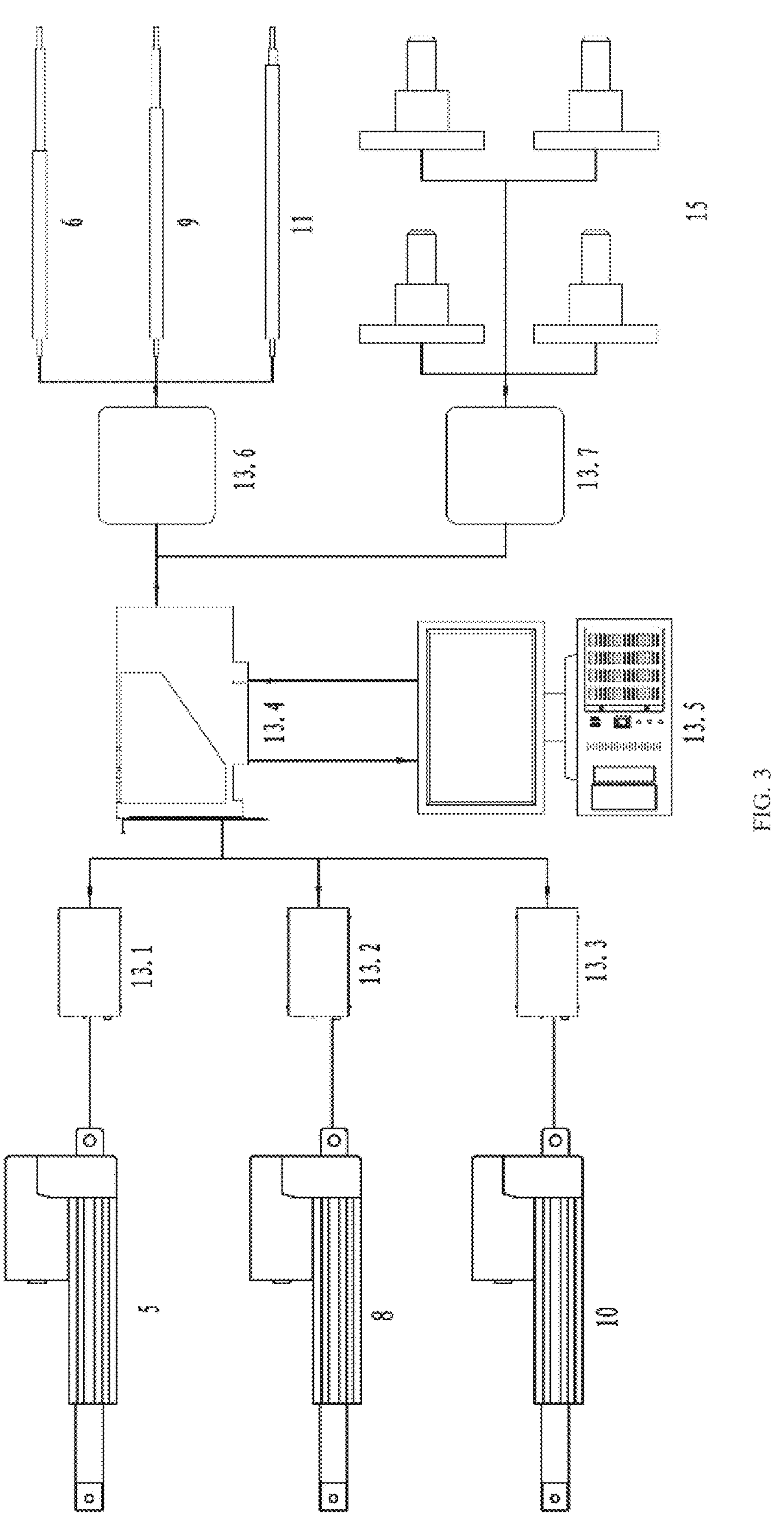
FIG. 3 is a schematic diagram of electrical connections in Embodiment 1 according to the present invention.
Figure 5:
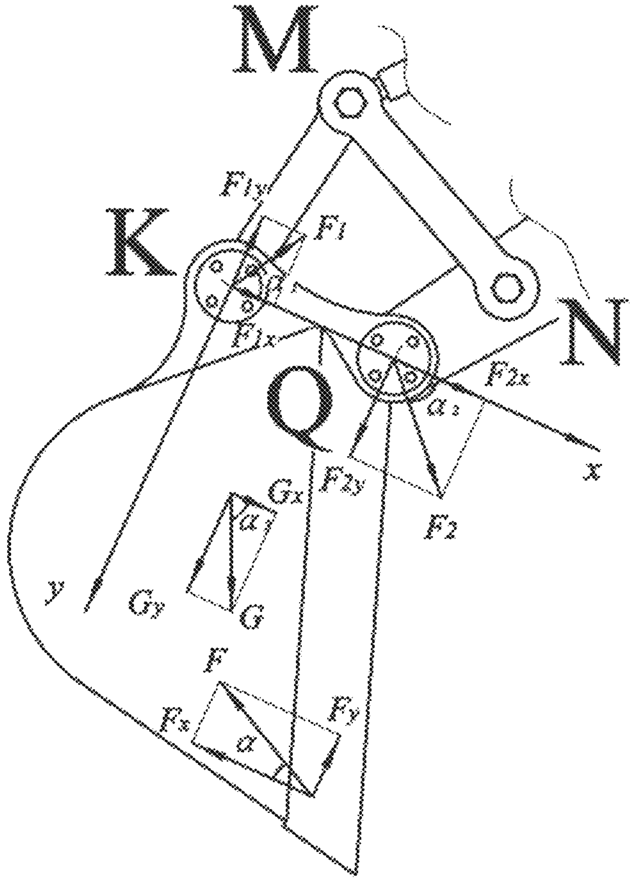
FIG. 5 is a force diagram of a bucket in Embodiment 1 according to the present invention.

Specifically, four pin shaft sensors are used to collectively measure the excavation resistance on the bucket during the operation. The specific calculation process involves the excavation resistance F on the bucket 3 during the operation, the self weight G of the bucket 3, and the effect from the counter forces $F_1$ and $F_2$ at the two pin shafts, as shown in FIG. 5. The direction along the line connecting the centers of the two pin shaft holes on the same side of the bucket is defined as the x direction, with the y direction perpendicular to the x direction. Since the force in the axial direction of the pin shaft on the bucket typically arises from material pressure on both sides of the bucket, the pressures on both sides can largely offset each other, resulting in a relatively small overall force in that direction. Therefore, the force in the axial direction of the pin shaft on the bucket is not considered here. From the principle of force balance, the force balance equation for the bucket 3 is expressed as:

$$\begin{cases} F_{1x} + F_{2x} + G_x = F_x \\ F_{1y} + F_y = G_y + F_{2y} \end{cases},$$

where $F_{1x}$ represents the total force in the x direction at point K on the pin shaft, and $F_{1y}$ represents the total force in the y direction at point K on the pin shaft; $F_{2x}$ represents the total force in the x direction at point Q on the pin shaft, and $F_{2y}$ represents the total force in the y direction at point Q on the pin shaft; $G_x$ represents the x-directional component force of the self weight G of the bucket 3, and $G_y$ represents the y-directional component force of the self weight G of the bucket 3; $F_x$ represents the x-directional component force of the excavation resistance, and $F_y$ represents the y-directional component force of the excavation resistance. Based on the above, the real-time magnitude F and direction a of the excavation resistance on the bucket 3 can be calculated as:

$$F=\sqrt{\begin{array}{l}(F_{1x}+F_{2x})^2+(F_{2y}-F_{1y})^2+G^2+\\2G[(F_{1x}+F_{2x})|\cos\alpha_3|+(F_{1y}-F_{2y})\sin\alpha_3]\end{array}},$$

$$\alpha=\arctan\frac{F_y}{F_x}=\arctan\frac{F_{2y}-F_{1y}+G_y}{F_{1x}+F_{2x}+G_x}=\arctan\frac{F_{2y}-F_{1y}+G\sin\alpha_3}{F_{1x}+F_{2x}+G\cos\alpha_3},$$

where the included angle $\alpha_3$ between self weight G of the bucket 3 and the x direction can be calculated based on the real-time position and posture of the bucket. The specific process involves the bucket push rod displacement sensor 6, the forearm push rod displacement sensor 9, and the upper arm push rod displacement sensor 11 sending real-time length information ($l_1$, $l_2$, and $l_3$) of the electric push rod for the bucket 5, the electric push rod for the forearm 8, and the electric push rod for the upper arm 10 to the displacement sensor signal processing module 13.6 for processing, and then transmitting the data to the computer 13.5 via the data acquisition card 13.4. The computer 13.5 calculates $\alpha_3$ using the following mathematical method:

$$\alpha_3=\arccos\frac{l_{KQ}^2+l_{MQ}^2-l_{MK}^2}{2l_{KQ}l_{MQ}}+\arccos\frac{l_{MQ}^2+l_{QN}^2-l_{MN}^2}{2l_{MQ}l_{QN}}+\arccos\frac{l_{AF}^2+l_3^2-l_{FB}^2}{2l_{AF}l_3}+\arccos\frac{l_3^2+l_{AC}^2-l_{FB}^2}{2l_3l_{AC}}+\arccos\frac{l_{FB}^2+l_{FA}^2-l_3^2}{2l_{FB}l_{FA}}+\arccos\frac{l_{EF}^2+l_{FD}^2-l_2^2}{2l_{EF}l_{FD}}+\angle CAS+\angle DFB+\angle EFQ+\angle NQF-\frac{5\pi}{2},$$

$$\text{where, } l_{MQ}=l_{MN}^2+l_{NQ}^2-2l_{MN}l_{NQ}(2\pi-\angle GNQ-\arccos\frac{l_{MN}^2+l_{FA}^2-l_1^2}{2l_{MN}l_{NG}}),$$

where $I_{KQ}$, $I_{MK}$, $I_{QN}$, $I_{MN}$, $I_{AF}$, $I_{FB}$, $I_{AC}$, $I_{FA}$, $I_{EF}$, $I_{FB}$ and angles ∠CAS, ∠DFB, ∠EFQ, ∠NOF, and ∠GNQ represent the fixed geometric dimensions and angles of the working device of the experimental platform, as indicated in FIG. 2.

Figure 6B:
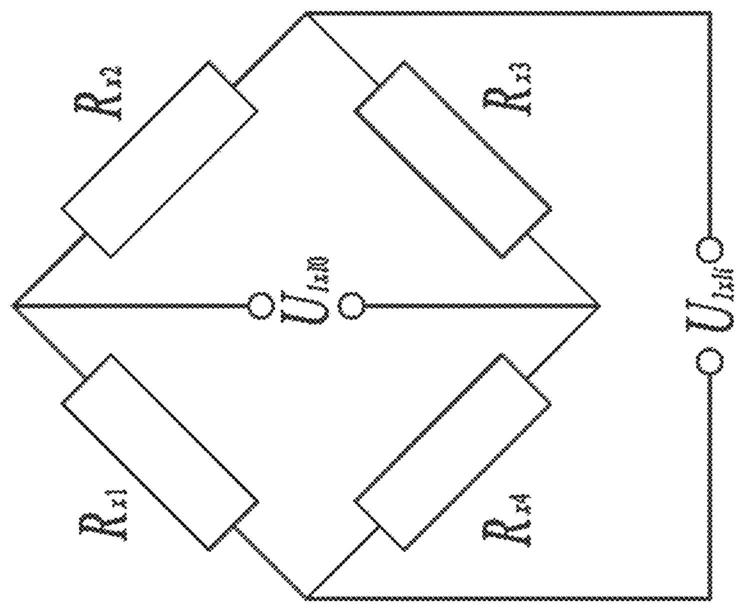
FIGS. 6A-6B show a principle diagram of a pin shaft sensor in Embodiment 1 according to the present invention.
Figure 6A:
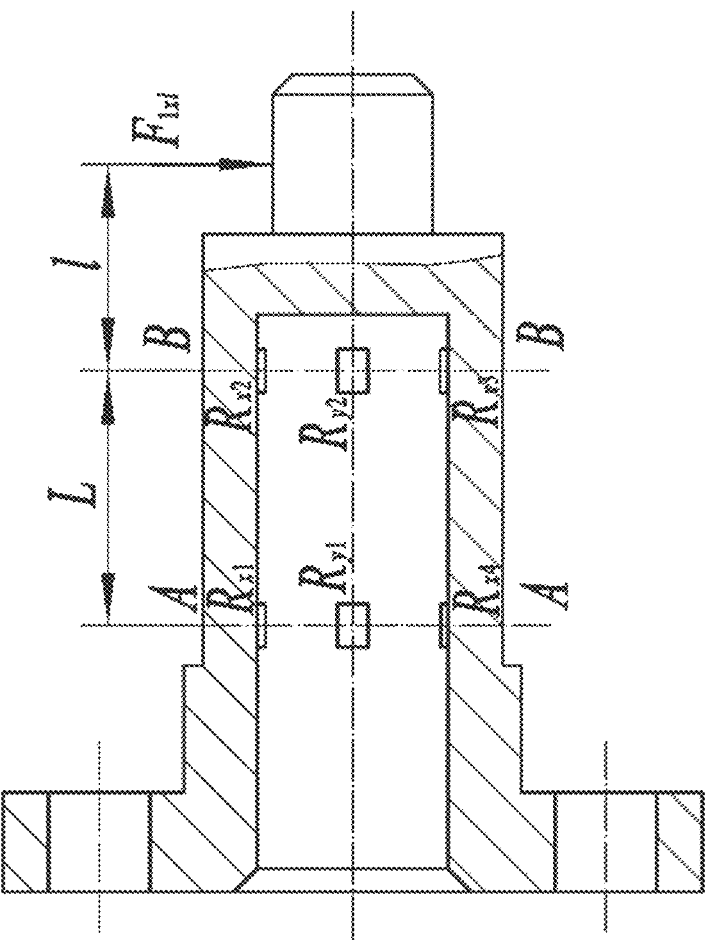
Figure 7:
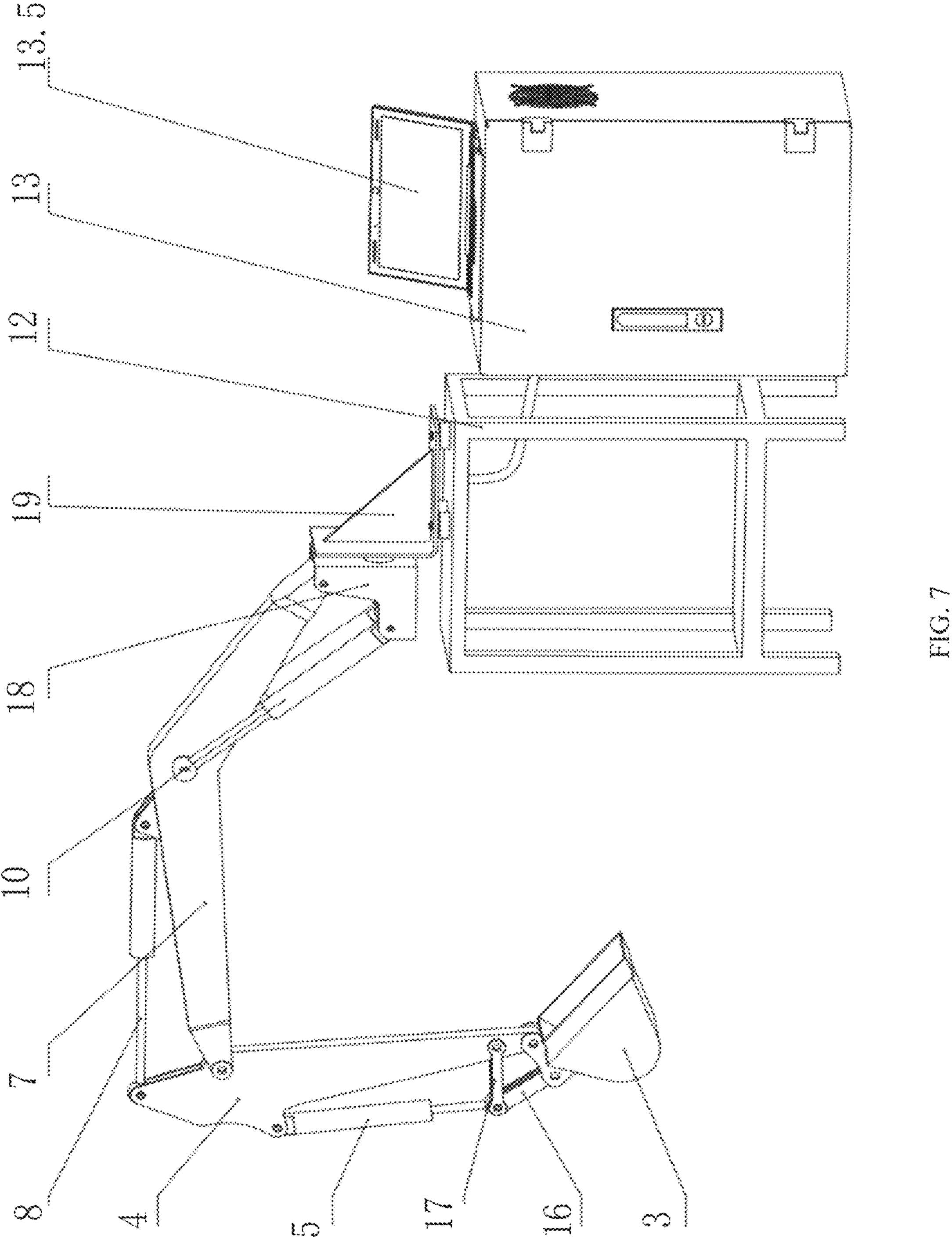
FIG. 7 is an overall side view of Embodiment 2 according to the present invention.
Figure 8:
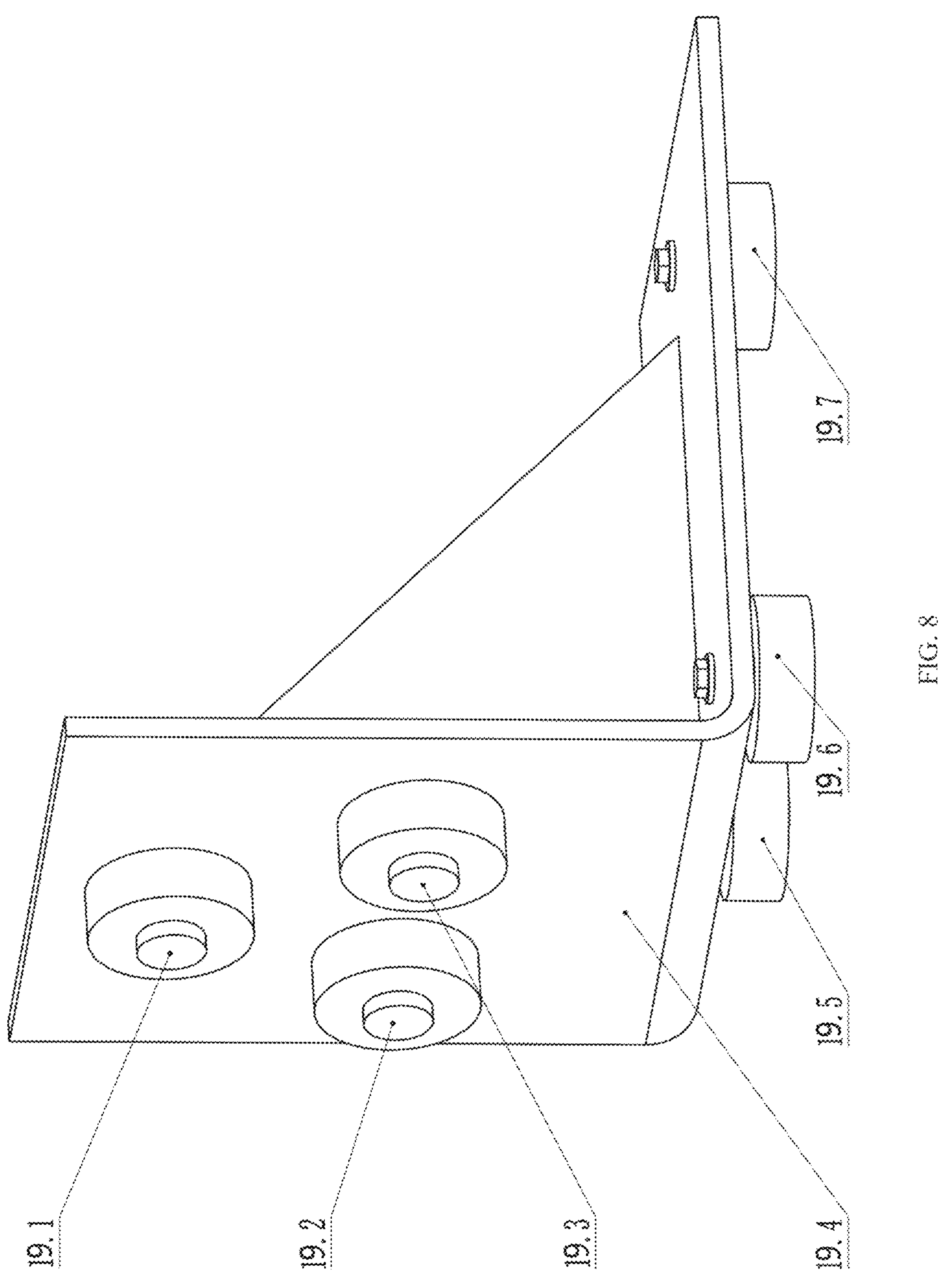
FIG. 8 is a schematic diagram of the installation position of a force sensor in Embodiment 2 according to the present invention.
Figure 9:
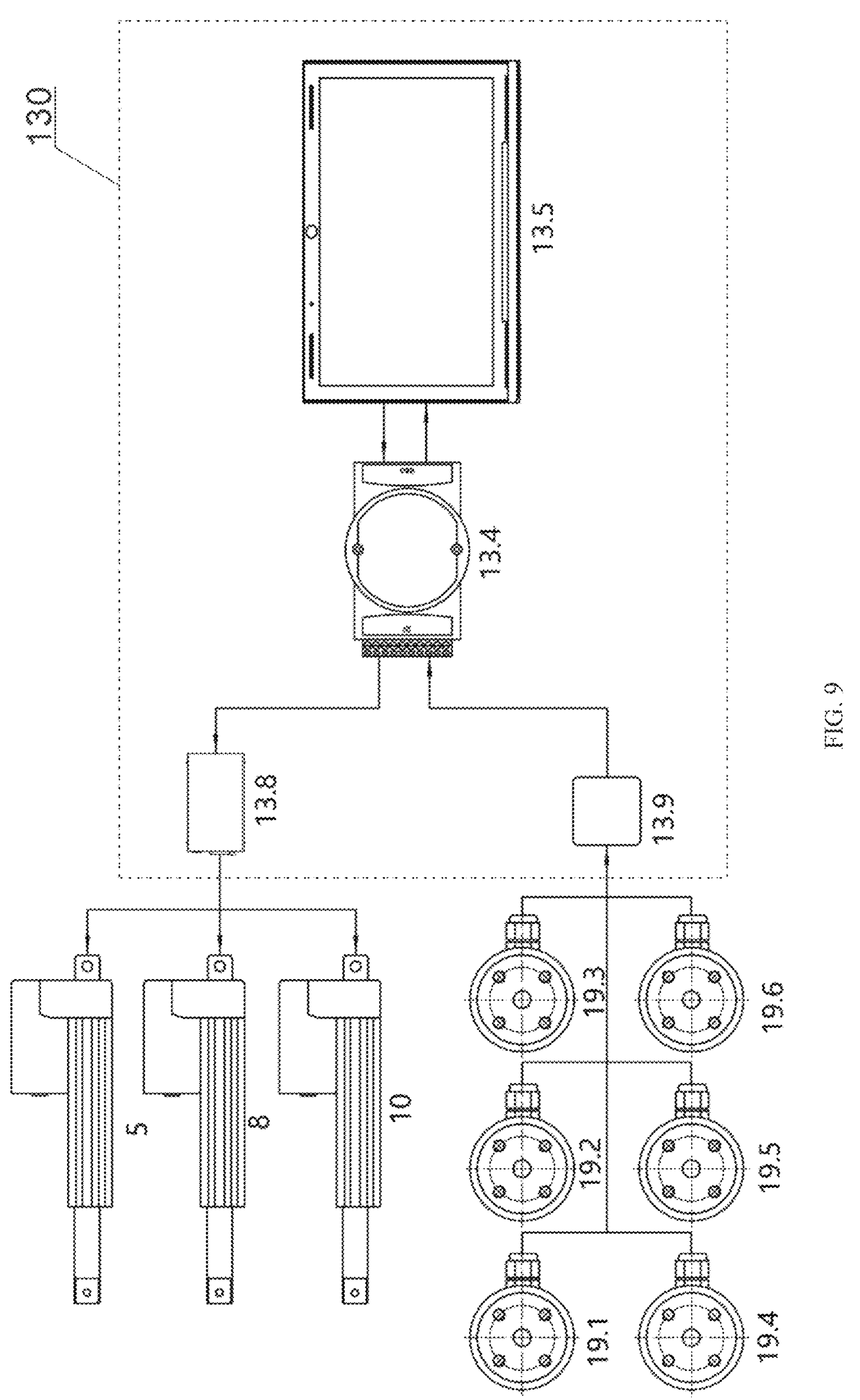
FIG. 9 is a schematic diagram of electrical connections in Embodiment 2 according to the present invention.

The total force Fix in the x direction at point K on the pin shaft is measured jointly by the left bucket-bucket connecting rod pin shaft sensor 15.1 and the right bucket-bucket connecting rod pin shaft sensor 15.4. The specific process involves attaching strain gages $R_{x1}$, $R_{x2}$, $R_{x3}$, and $R_{x4}$ to the inner hole of the left bucket-bucket connecting rod pin shaft sensor 15.1 along the x-directional longitudinal section. $R_{x1}$ and $R_{x4}$ are positioned on transverse section A-A of the left bucket-bucket connecting rod pin shaft sensor 15.1, while $R_{x2}$ and $R_{x3}$ are positioned on transverse section B-B of the left bucket-bucket connecting rod pin shaft sensor 15.1. The horizontal distance between transverse sections A-A and B-B is L, and the distance of the x-directional force $F_{1xl}$ on the left bucket-bucket connecting rod pin shaft sensor 15.1 from transverse section B-B is represented as l. The four strain gages have their initial parameters set equal, are connected in a full-bridge configuration, and are installed as shown in FIGS. 6A-6B. According to Wheatstone bridge principles, the x-directional force $F_{1xl}$ on the left bucket-bucket connecting rod pin shaft sensor 15.1 can be obtained as:

$$F_{1xl}=\frac{2EW_PU_{1xli}}{K_0LU_{1xl0}},$$

where E represents the elasticity modulus of the pin shaft material; $W_p$ represents the section modulus of the pin shaft material; $K_0$ represents the sensitivity coefficient of the strain gage; $U_{1xl0}$ represents the input voltage in the x-directional bridge for the left bucket-bucket connecting rod pin shaft sensor 15.1; $U_{1xli}$ represents the output voltage in the x-directional bridge for the left bucket-bucket connecting rod pin shaft sensor 15.1.

During the operation, the output voltage variation of the x-directional strain gages on the left bucket-bucket connecting rod pin shaft sensor 15.1 is processed by the pin shaft sensor signal processing module 13.7, and the processed data is transmitted to the computer 13.5 via the data acquisition card 13.4. The computer 13.5 calculates the real-time x-directional force $F_{1xl}$ on the left bucket-bucket connecting rod pin shaft sensor 15.1 using the above formula.

The right bucket-bucket connecting rod pin shaft sensor 15.4 adopts an identical strain gage layout as the left bucket-bucket connecting rod pin shaft sensor 15.1. Similarly, the real-time x-directional force $F_{1xr}$ on the right bucket-bucket connecting rod pin shaft sensor 15.4 can be obtained using the formula:

$$F_{1xr}=\frac{2EW_PU_{1xri}}{K_0LU_{1xr0}},$$

where $U_{1xr0}$ represents the input voltage in the x-directional bridge for the right bucket-bucket connecting rod pin shaft sensor 15.4, and $U_{1xri}$ represents the output voltage in the x-directional bridge for the right bucket-bucket connecting rod pin shaft sensor 15.4.

From the above formulas, the total force $F_{1x}$ in the x direction at point K on the pin shaft is calculated as:

$$F_{1x}=F_{1xl}+F_{1xr}=\frac{2EW_P}{K_0L}\left(\frac{U_{1xli}}{U_{1xl0}}+\frac{U_{1xri}}{U_{1xr0}}\right).$$

However, the total force $F_{1y}$ in the y direction at point K on the pin shaft is measured by the left bucket-bucket connecting rod pin shaft sensor 15.1 and the right bucket-bucket connecting rod pin shaft sensor 15.4. The specific process involves attaching strain gages $R_{y1}$, $R_{y2}$, $R_{y3}$, and $R_{y4}$ to the inner hole of the left bucket-bucket connecting rod pin shaft sensor 15.1 along the y-directional longitudinal section. $R_{y1}$ and $R_{y4}$ are positioned on transverse section C-C of the left bucket-bucket connecting rod pin shaft sensor 15.1, while $R_{y2}$ and $R_{y3}$ are positioned on transverse section D-D of the left bucket-bucket connecting rod pin shaft sensor 15.1. The horizontal distance between transverse sections C-C and D-D, identical to that between transverse sections A-A and B-B, is L. Using the same measurement and calculation methods as $F_{1xl}$, the real-time y-directional force $F_{1yl}$ on the left bucket-bucket connecting rod pin shaft sensor 15.1 and the real-time y-directional force $F_{1yr}$ on the right bucket-bucket connecting rod pin shaft sensor 15.4 are determined. By adding $F_{1yl}$ and $F_{1yr}$, the y-directional force $F_{1y}$ at the hinge point between the bucket 3 and the bucket connecting rod 16 is calculated as:

$$F_{1y}=F_{1yl}+F_{1yr}=\frac{2EW_P}{K_0L}\left(\frac{U_{1yli}}{U_{1yl0}}+\frac{U_{1yri}}{U_{1yr0}}\right),$$

where $U_{1yl0}$ represents the input voltage in the y-directional bridge for the left bucket-bucket connecting rod pin shaft sensor 15.1, and $U_{1yli}$ represents the output voltage in the y-directional bridge for the left bucket-bucket connecting rod pin shaft sensor 15.1; $U_{1yr0}$ represents the input voltage in the y-directional bridge for the right bucket-bucket connecting rod pin shaft sensor 15.4, and $U_{1yri}$ represents the output voltage in the y-directional bridge for the right bucket-bucket connecting rod pin shaft sensor 15.4.

The total x-directional force $F_{2x}$ and the total y-directional force $F_{2y}$ at point Q on the pin shaft are obtained using the same measurement and calculation methods as $F_{1x}$ and $F_{1y}$, resulting in real-time forces $F_{2x}$ and $F_{2y}$ as:

$$F_{2x} = \frac{2EW_P}{K_0L}\left(\frac{U_{2xli}}{U_{2xl0}} + \frac{U_{2xri}}{U_{2xr0}}\right)$$

$$F_{2y} = \frac{2EW_P}{K_0L}\left(\frac{U_{2yli}}{U_{2yl0}} + \frac{U_{2yri}}{U_{2yr0}}\right),$$

where $U_{2xl0}$ represents the input voltage in the x-directional bridge for the left bucket-forearm pin shaft sensor 15.2, and $U_{2xli}$ represents the output voltage in the x-directional bridge for the left bucket-forearm pin shaft sensor 15.2; $U_{2xr0}$ represents the input voltage in the x-directional bridge for the right bucket-forearm pin shaft sensor 15.3, and $U_{2xri}$ represents the output voltage in the x-directional bridge for the right bucket-forearm pin shaft sensor 15.3; $U_{2ylo}$ represents the input voltage in the y-directional bridge for the left bucket-forearm pin shaft sensor 15.2, and $U_{2yli}$ represents the output voltage in the y-directional bridge for the left bucket-forearm pin shaft sensor 15.2; $U_{2yr0}$ represents the input voltage in the y-directional bridge for the right bucket-forearm pin shaft sensor 15.3, and $U_{2yri}$ represents the output voltage in the y-directional bridge for the right bucket-forearm pin shaft sensor 15.3.

Upon obtaining real-time information on all component forces and angles, the real-time excavation resistance F on the bucket can be calculated.

Embodiment 2

The present embodiment discloses a platform for testing the excavation resistance of a small-sized backhoe excavator, which comprises a bucket, a mechanical arm device, a measuring device, a workbench frame, and a control device.

The bucket is hinged to the mechanical arm device, which is fixed on the workbench frame; the control device is electrically connected to the measuring device, data acquired by the measuring device is used to construct a force balance equation, and through force analysis, excavation resistance is obtained.

To further optimize the above technical solution, the mechanical arm device comprises a forearm, an electric push rod for the bucket, an upper arm, an electric push rod for the forearm, an electric push rod for the upper arm, a bucket connecting rod, a forearm connecting rod, a sensor bracket, and a boom hinge bracket.

The upper arm is hinged to the forearm; the fixed end of the electric push rod for the bucket is fixed on the forearm, with the free end hinged to the bucket through the bucket connecting rod to drive bucket movement; one end of the forearm connecting rod is hinged to the forearm, with the other end connected to the hinge point between the bucket connecting rod and the electric push rod for the bucket; the fixed end of the electric push rod for the forearm is fixed on the upper arm, with the free end connected to the forearm to drive forearm movement; the fixed end of the electric push rod for the upper arm is fixed on the boom hinge bracket, with the free end connected to the upper arm to drive upper arm movement; the boom hinge bracket is installed on the workbench frame through the sensor bracket.

To further optimize the above technical solution, the measuring device comprises six force sensors. The sensor bracket consists of the mutually perpendicular first installation surface and second installation surface. Three of the force sensors are arranged on each of the first installation surface and the second installation surface, and the three force sensors on each installation surface are arranged in a triangular configuration. The first component force of the resistance is obtained through the first installation surface, and the second component force of the resistance is obtained through the second installation surface. The lateral offset and the tilting offset are obtained based on the difference between the force sensors on each installation surface.

To further optimize the above technical solution, the control device comprises a driving device, a force sensor transmitter group, a data acquisition card, and a master computer. The driving device drives the electric push rod for the bucket, the electric push rod for the forearm, and the electric push rod for the upper arm, respectively. The force sensor transmitter group is electrically connected to the six force sensors, respectively. The driving device and the force sensor transmitter group are electrically connected to the data acquisition card, respectively. The data acquisition card interacts with the master computer for data exchange.

The mechanical arm device comprises a bucket 3, a bucket connecting rod 16, a forearm connecting rod 17, an electric push rod for the bucket 5, a forearm 4, an electric push rod for the forearm 8, an upper arm 7, an electric push rod for the upper arm 10, a boom hinge bracket 18, a force sensor module 19, and a workbench frame 12.

The measuring device comprises the force sensor module 19, which comprises force sensors $R_1$ 19.1, $R_2$ 19.2, and $R_3$ 19.3, a sensor support frame 19.4, and force sensors $R_4$ 19.5, $R_5$ 19.6, and $R_6$ 19.7.

The control device 130 comprises an electrical cabinet 13, a drive module 13.8, a force sensor transmitter group 13.9, a data acquisition card 13.4, and a computer 13.5.

The electric push rod for the bucket 5, the electric push rod for the forearm 8, the electric push rod for the upper arm 10, the drive module 13.8, the data acquisition card 13.4, and the computer 13.5 collectively constitute the motion control system of the mechanical arm device, controlling the mechanical arm device to complete the designated excavating movements.

The force sensor module 19, the force sensor transmitter group 13.9, the data acquisition card 13.4, and the computer 13.5 collectively constitute the excavation resistance detection system, responsible for measuring the real-time excavation resistance experienced during the motion of the mechanical arm device.

Figure 10:
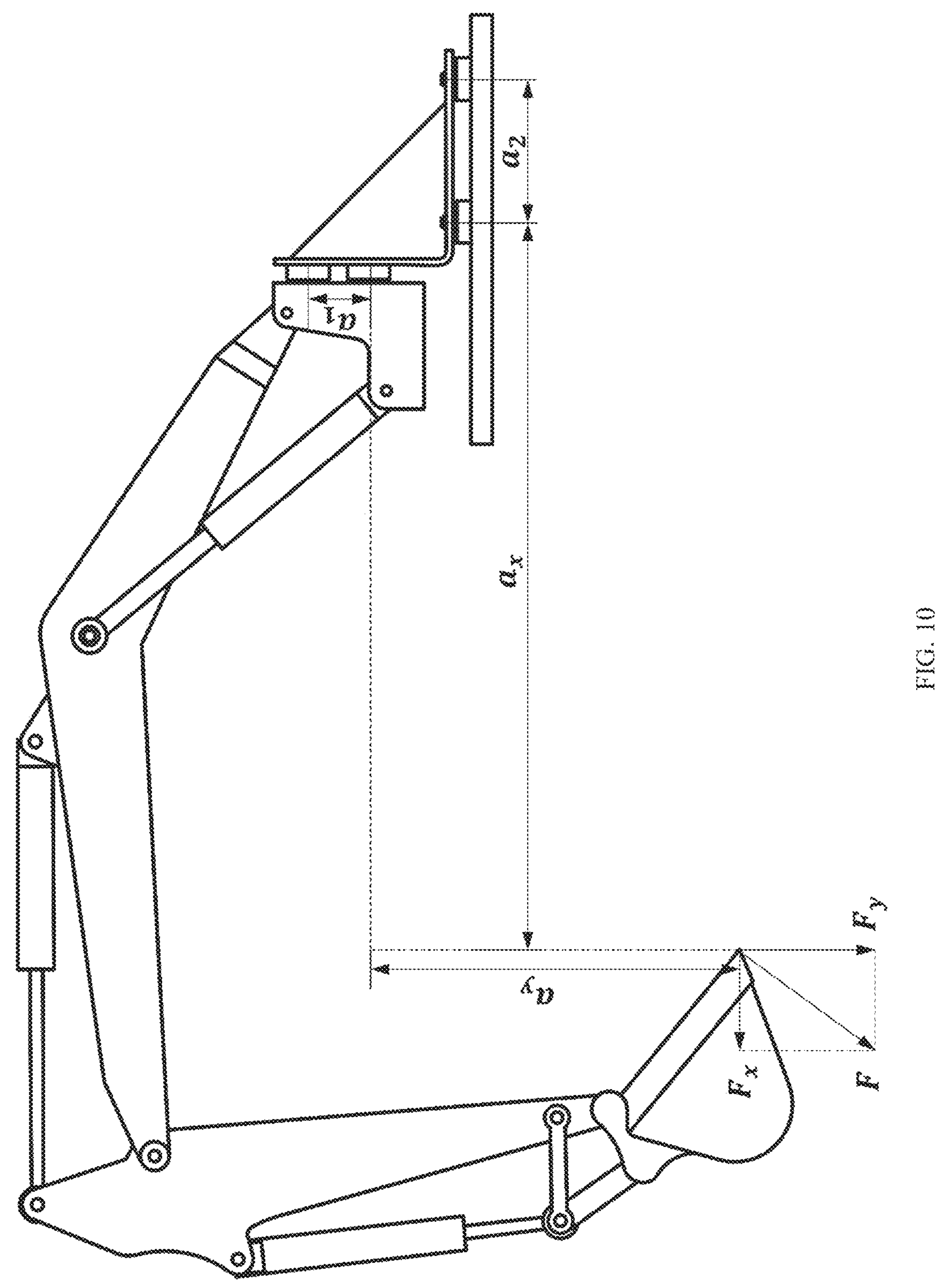
FIG. 10 is a schematic diagram of resistance positions in Embodiment 2 according to the present invention.

Specifically, two groups of triangularly arranged one-dimensional force sensors, which are installed perpendicular to each other, are used to measure the magnitude and direction of the excavation resistance on the bucket during the operation, along with the lateral and tilting offsets of the excavation resistance. The specific calculation process involves assuming that during the operation, the bucket 3 experiences an excavation resistance denoted as F. $F_x$ represents the component force of the excavation resistance parallel to the horizontal plane, $F_y$ represents the component force of the excavation resistance perpendicular to the horizontal plane, a represents the included angle between the excavation resistance and the horizontal plane, ax represents the horizontal distance between the center of the excavation resistance and the x-directional measurement surface formed by the force measuring points of the force sensors $R_1$ 19.1, $R_2$ 19.2, and $R_3$ 19.3, and $a_y$ represents the vertical distance between the center of the excavation resistance and the y-directional measurement surface formed by the force measuring points of the force sensors $R_4$ 19.5, $R_5$ 19.6, and $R_6$ 19.7, as shown in FIG. 10. Since the component $F_z$ perpendicular to $F_x$ and $F_y$ has minimal influence on the excavation resistance F, it is not considered here.

Figure 11B:
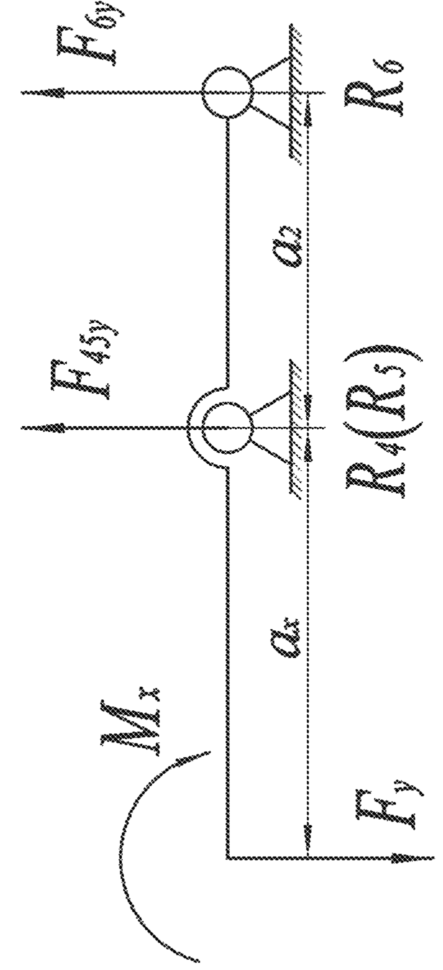
FIGS. 11A-11B show a simplified force diagram of a sensor group in Embodiment 2 according to the present invention.
Figure 11A:
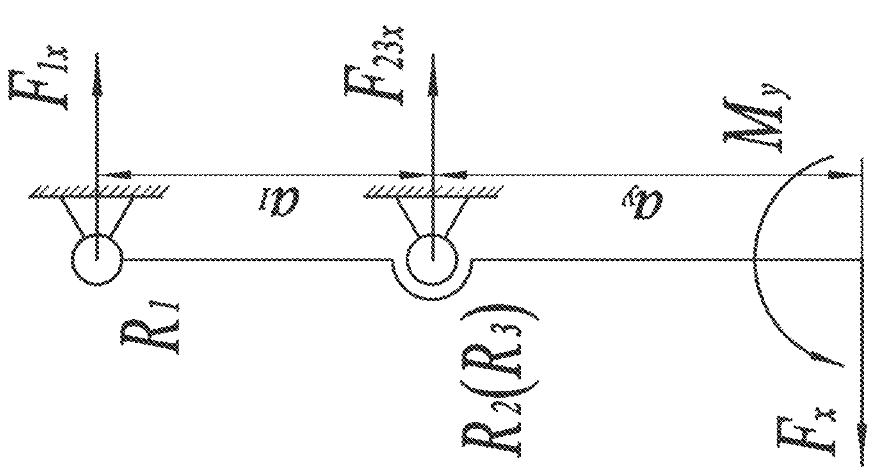

For the sensor group composed of the force sensors $R_1$ 19.1, $R_2$ 19.2, and $R_3$ 19.3, its force situation is shown in FIG. 11A. Employing the principle of force balance, the following force balance equation can be formulated:

$$\begin{cases} \sum X = 0 & F_{1x} + F_{23x} - F_x = 0 \\ \sum M = 0 & -F_{1x}a_1 - F_x a_y + M_y = 0 \end{cases},$$

where $F_{1x}$ represents the force measured by the force sensor $R_1$ 19.1, $F_{23x}$ represents the combined force measured by the force sensors $R_2$ 19.2 and $R_3$ 19.3, $a_1$ represents the vertical distance between the force measuring points of force sensors $R_1$ 19.1 and $R_2$ 19.2, and My represents the equivalent moment of the y-directional component force $F_y$ of the excavation resistance when shifting it to the x-directional measurement surface. From the balance equation, the x-directional component force $F_x$ of the excavation resistance is expressed as:

$$F_x = F_{1x} + F_{2x} + F_{3x};$$

For the sensor group composed of the force sensors $R_4$ 19.5, $R_5$ 19.6, and $R_6$ 19.7, its force situation is shown in FIG. 11B. Employing the principle of force balance, the following force balance equation can be formulated:

$$\begin{cases} \sum Y = 0 & F_{45y} + F_{6y} - F_y = 0 \\ \sum M = 0 & F_{6y}a_2 + F_y a_x - M_x = 0 \end{cases},$$

where $F_{45y}$ represents the combined force measured by the force sensors $R_4$ 19.5 and $R_5$ 19.6, $F_{6y}$ represents the force measured by the force sensor $R_6$ 19.7, $a_2$ represents the horizontal distance between the force measuring points of force sensors $R_5$ 19.6 and $R_6$ 19.7, and $M_x$ represents the equivalent moment of the x-directional component force $F_x$ of the excavation resistance when shifting it to the y-directional measurement surface. From the balance equation, the y-directional component force $F_y$ of the excavation resistance is expressed as:

$$F_y = F_{4y} + F_{5y} + F_{6y}.$$

Based on the above, the excavation resistance F can be obtained as:

$$F = \sqrt{F_x^2 + F_y^2} = \sqrt{(F_{1x} + F_{2x} + F_{3x})^2 + (F_{4y} + F_{5y} + F_{6y})^2}.$$

The included angle α between the excavation resistance and the horizontal plane can be calculated using the following formula:

$$\alpha = \arctan\frac{F_y}{F_x} = \arctan\frac{F_{4y} + F_{5y} + F_{5y} - F_{6y}}{F_{1x} + F_{2x} + F_{3x}}.$$

Figure 12B:
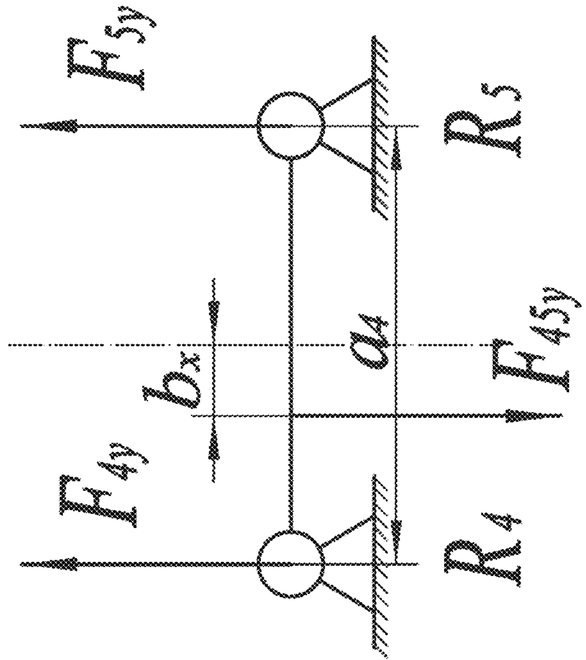
FIGS. 12A-12B show a simplified force diagram of offsets in Embodiment 2 according to the present invention.
Figure 12A:
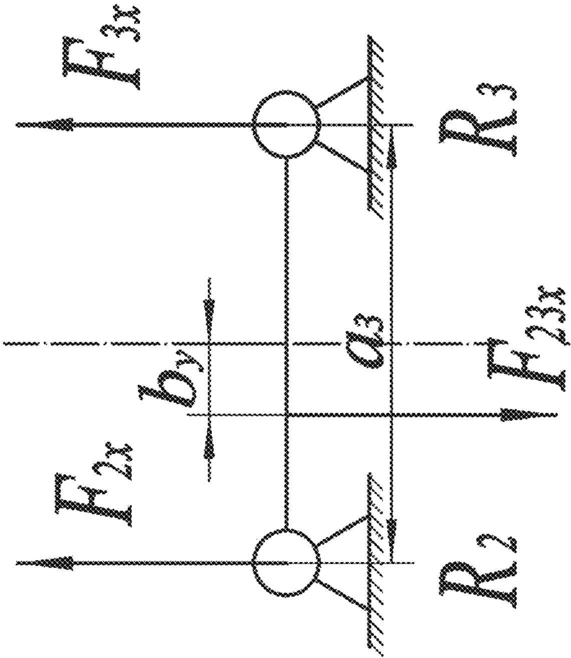

In the case of lateral offset in the excavation resistance, there is a difference in the force measured by the force sensors $R_2$ 19.2 and $R_3$ 19.3. The simplified mechanical diagram is shown in FIG. 12A. Assuming the horizontal distance between the force measuring points of force sensors $R_2$ 19.2 and $R_3$ 19.3 as $a_3$, in this case, the balance equation there is expressed as:

$$\begin{cases} \sum X = 0 & F_{2x} + F_{3x} - F_{23x} = 0 \\ \sum M = 0 & F_{3x}a_3 - F_{23x}(\frac{1}{2}a_3 - b_y) = 0 \end{cases}.$$

Rearranging the above equation, the lateral offset $b_y$ of the excavation resistance can be obtained as:

$$b_y = \frac{1}{2}a_3\frac{F_{2x} - F_{3x}}{F_{2x} + F_{3x}}.$$

In the case of tilting offset in the excavation resistance, there is a difference in the force measured by the force sensors $R_4$ 19.5 and $R_5$ 19.6. The simplified mechanical diagram is shown in FIG. 12B. Assuming the horizontal distance between the force measuring points of force sensors $R_4$ 19.5 and $R_5$ 19.6 as $a_4$, in this case, the balance equation there is expressed as:

$$\begin{cases} \sum X = 0 & F_{4y} + F_{5y} - F_{45y} = 0 \\ \sum M = 0 & F_{5y}a_4 - F_{45y}(\frac{1}{2}a_4 - b_x) = 0 \end{cases}.$$

Rearranging the above equation, the tilting offset bx of the excavation resistance can be obtained as:

$$b_x = \frac{1}{2}a_4\frac{F_{4y} - F_{5y}}{F_{4y} + F_{5y}}.$$

During the operation on the test bench, the force sensors $R_1$ 19.1, $R_2$ 19.2, $R_3$ 19.3, $R_4$ 19.5, $R_5$ 19.6, and $R_6$ 19.7 transmit real-time tension and compression force signals from the points where the sensors are positioned to the force sensor transmitter group 13.9 for processing, and the processed signals are then transmitted to the computer 13.5 via the data acquisition card 13.4. The computer 13.5, utilizing the formulas mentioned above, processes the tension and compression force information from each sensor to obtain the real-time magnitude and direction of the excavation resistance, along with the lateral and tilting offsets of the excavation resistance.

The embodiments in the specification are all described in a progressive manner, and each embodiment focuses on differences from other embodiments, and portions that are the same and similar between the embodiments may be referred to each other. Since the device disclosed in the embodiment corresponds to the method disclosed in the embodiment, the description is relatively simple, and reference may be made to the partial description of the method.

The above description of the disclosed embodiments enables those skilled in the art to implement or use the present invention. Various modifications to these embodiments will be apparent to those skilled in the art, and the generic principles defined herein may be applied to other embodiments without departing from the spirit or scope of the present invention. Thus, the present invention is not intended to be limited to these embodiments shown herein but is to accord with the broadest scope consistent with the principles and novel features disclosed herein.

What is claimed is:

1. A platform for testing excavation resistance of a small-sized backhoe excavator, comprising a bucket, a mechanical arm device, a measuring device, a workbench frame, and a control device, wherein the bucket is hinged to the mechanical arm device, the mechanical arm device is fixed on the workbench frame; the control device is electrically connected to the measuring device, data acquired by the measuring device is used to construct a force balance equation, and through force analysis, excavation resistance is obtained;

wherein the mechanical arm device comprises a forearm, an electric push rod for the bucket, an upper arm, an electric push rod for the forearm, an electric push rod for the upper arm, a bucket connecting rod, and a forearm connecting rod, wherein the upper arm is hinged to the forearm;

a fixed end of the electric push rod for the bucket is fixed on the forearm, with a free end hinged to the bucket through the bucket connecting rod to drive bucket movement;

a first end of the forearm connecting rod is hinged to the forearm, with a second end connected to a hinge point between the bucket connecting rod and the electric push rod for the bucket;

a fixed end of the electric push rod for the forearm is fixed on the upper arm, with a free end connected to the forearm to drive forearm movement; and a fixed end of the electric push rod for the upper arm is fixed on the workbench frame, with a free end connected to the upper arm to drive upper arm movement;

the measuring device comprises a bucket push rod displacement sensor, a forearm push rod displacement sensor, an upper arm push rod displacement sensor, and four pin shaft sensors, wherein the bucket push rod displacement sensor is installed on the electric push rod for the bucket to obtain displacement of the electric push rod for the bucket;

the forearm push rod displacement sensor is installed on the electric push rod for the forearm to obtain displacement of the electric push rod for the forearm;

the upper arm push rod displacement sensor is installed on the electric push rod for the upper arm to obtain displacement of the electric push rod for the upper arm; and the pin shaft sensors are installed on both sides of a hinge point between the bucket and the forearm and on both sides of a hinge point between the bucket connecting rod and the bucket.

2. The platform for testing the excavation resistance of the small-sized backhoe excavator according to claim 1, wherein the control device comprises a driving device, a data acquisition card, a master computer, a displacement sensor signal processing module, and a pin shaft sensor signal processing module, wherein the driving device drives the electric push rod for the bucket, the electric push rod for the forearm, and the electric push rod for the upper arm, respectively;

the displacement sensor signal processing module is electrically connected to the bucket push rod displacement sensor, the forearm push rod displacement sensor, and the upper arm push rod displacement sensor, respectively;

the pin shaft sensor signal processing module is electrically connected to the four pin shaft sensors, respectively;

the driving device, the displacement sensor signal processing module, and the pin shaft sensor signal processing module are electrically connected to the data acquisition card, respectively; and the data acquisition card interacts with the master computer for data exchange.

3. The platform for testing the excavation resistance of the small-sized backhoe excavator according to claim 1, wherein the mechanical arm device further comprises sensor bracket and a boom hinge bracket, wherein a fixed end of the electric push rod for the upper arm is fixed on the boom hinge bracket, with a free end connected to the upper arm to drive upper arm movement; and the boom hinge bracket is installed on the workbench frame through the sensor bracket.

4. The platform for testing the excavation resistance of the small-sized backhoe excavator according to claim 3, wherein the measuring device comprises six force sensors, and the sensor bracket consists of mutually perpendicular first installation surface and second installation surface, wherein three of the force sensors are arranged on each of the first installation surface and the second installation surface, and the three force sensors on each installation surface are arranged in a triangular configuration;

a first component force of resistance is obtained through the first installation surface, and a second component force of the resistance is obtained through the second installation surface;

a lateral offset and a tilting offset are obtained based on a difference between the force sensors on each installation surface.

5. The platform for testing the excavation resistance of the small-sized backhoe excavator according to claim 4, wherein the control device comprises a driving device, a force sensor transmitter group, a data acquisition card, and a master computer, wherein the driving device drives the electric push rod for the bucket, the electric push rod for the forearm, and the electric push rod for the upper arm, respectively;

the force sensor transmitter group is electrically connected to the six force sensors, respectively;

the driving device and the force sensor transmitter group are electrically connected to the data acquisition card, respectively; and the data acquisition card interacts with the master computer for data exchange.

* * * * *